United States Patent
Sorenson, III et al.

(10) Patent No.: US 12,045,199 B1
(45) Date of Patent: Jul. 23, 2024

(54) LIGHTWEIGHT FILESYSTEM FOR REMOTE STORAGE CACHING

(71) Applicant: Amazon Technologies, Inc., Seattle, WA (US)

(72) Inventors: James Christopher Sorenson, III, Madison, WI (US); Hao He, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/189,909

(22) Filed: Mar. 24, 2023

(51) Int. Cl.
*G06F 12/00* (2006.01)
*G06F 16/00* (2019.01)
*G06F 16/172* (2019.01)
*G06F 16/182* (2019.01)
*G06F 16/185* (2019.01)

(52) U.S. Cl.
CPC .......... *G06F 16/172* (2019.01); *G06F 16/183* (2019.01); *G06F 16/185* (2019.01)

(58) Field of Classification Search
None
See application file for complete search history.

(56) References Cited

U.S. PATENT DOCUMENTS

| | | | |
|---|---|---|---|
| 9,460,106 B2 | 10/2016 | Matsuzwa | |
| 9,852,149 B1 | 12/2017 | Taylor et al. | |
| 10,417,191 B2 | 9/2019 | Huang et al. | |
| 2014/0006354 A1* | 1/2014 | Parkison | G06F 3/0635 |
| | | | 707/661 |
| 2019/0095336 A1* | 3/2019 | Barczak | G06F 9/45558 |

* cited by examiner

*Primary Examiner* — Tuan A Pham
(74) *Attorney, Agent, or Firm* — S. Scott Foster; Kowert, Hood, Munyon, Rankin & Goetzel, P.C.

(57) ABSTRACT

A lightweight filesystem may be provided for remote storage caching. A filesystem may maintain a persistent cache for a data set stored as data files in immutable data objects in a remote data store. Filesystem metadata may be evaluated to determine whether a portion of a data file is stored in the persistent cache according to an offset and length specified in a request. If in the persistent cache, data obtained from a data block in the persistent cache may be returned. If not in the persistent cache, then the remote data store may be accessed and the data file in the immutable data object read to obtain the portion of the data file.

20 Claims, 8 Drawing Sheets

LIGHTWEIGHT FILESYSTEM FOR REMOTE STORAGE CACHING

BACKGROUND

Data storage systems often serve applications where access performance can have important impacts on the quality of work performed by the application. Many different factors can contribute to access performance on a database. Techniques that can improve access performance to data sets of data storage systems are thus highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may a lightweight filesystem for remote storage caching. Modern general-purpose filesystems maintain sophisticated data structures such as inodes and journal to provide features such as directory hierarchy, extent allocation, access control, and crash recovery. Many of these features are not needed and incur overhead for some data storage use cases, such as database systems, that operate on large files backed by a remote data store. Therefore, in order to improve the performance of a filesystem for these scenarios, various embodiments may take advantage of scenarios where the data set's authoritative storage is remote and is updated differently from the filesystem and where files that constitute a data set are large (e.g. larger than 32 MB) and immutable. For instance, when new updates are uploaded as new files, and existing files are periodically merged and compacted into new files.

In various embodiments, such a filesystem may be lightweight, conserving computing resources for other tasks, including tasks that can speed up access or other data set processing tasks. In some embodiments, the filesystem may divide a local persistent block-based storage device (e.g., a raw block device, such as a 7 TB SSD)) into data blocks (e.g., large blocks like 4 MB) and use the last portion of each block (e.g., last 512 bytes) to store metadata for that data block. Every block may store a range of bytes for a file in a remote data store; thus the metadata in a data block may include the an identifier for a remote data object storing the file (e.g., the remote file path), the remote file's range offset and length. This may eliminate the need to implement a directory hierarchy. Instead, the total set of metadata for all data blocks may be small enough to be loaded into memory. For instance, a 7 TB SSD will comprise 1.75 MM blocks, containing less than 1 GB of metadata.

Figure 1:
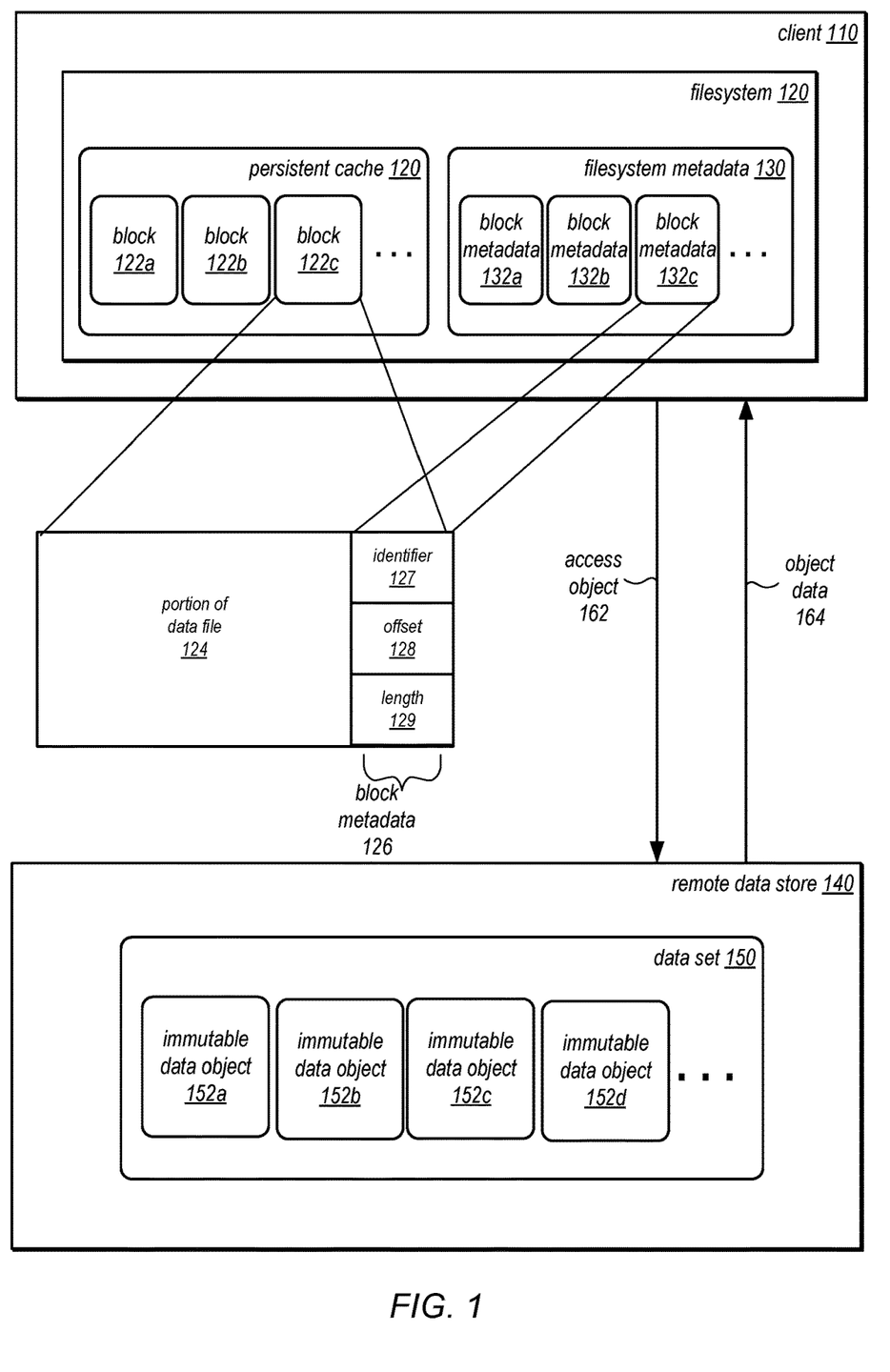
FIG. 1 is a logical block diagram illustrating a lightweight filesystem for remote storage caching, according to some embodiments.

FIG. 1 is a logical block diagram illustrating a lightweight filesystem for remote storage caching, according to some embodiments. A data set 150, such as a database (e.g., relational, non-relational, time series, and various other types of database) or other collection of data items, may be stored in a file format in immutable data objects, immutable data objects 152a, 152b, 152c, 152d, and so on) in remote data store 140 to provide persistent storage of the data set 150, which may be accessed for various operations. Thus, data set 150 may be stored in remote data store 140, which may be a network accessible (e.g., over a network connection) data store separate from a client 110. In some embodiments, remote data store 140 may be a cloud-based object storage service, like data storage service 240 of provider network 200 discussed below with regard to FIG. 2.

Client 110 may be one of various applications that access (or provide access to) data set 150. For example, as discussed in detail below with regard to FIGS. 2-5, client 110 may be a database system, such as database service 210, which may implement filesystem 120 to handle access to a database stored as data set 150. Filesystem 120 may handle various types of requests to access data set 150, as discussed in detail below with regard to FIGS. 4-6. Filesystem 120 may implement a persistent cache 120 of data blocks 122a, 122b, 122c, and so on. Each block may contain a portion of a data file (e.g., stored in a file format as discussed below with regard to FIG. 4). Thus the data block may store a range of bytes or other portion of the data file, as indicated at 124. A portion of the block may store block metadata 126, which may include the identifier 127 for the corresponding immutable data object 152 in data set 150 of remote data store 140, as well as the range offset 128 and length of the file. Filesystem metadata 130 may also maintain respective copies of block metadata 126 (e.g., block metadata 132a), such as block metadata 132a, 132b, 132c, and so on. This filesystem metadata 130 may be used to determine whether a read of data set 150 can be served from persistent cache 120 or remote data store 140.

Filesystem 120 may transparently access objects 162 and receive them 164 from remote data store 140 to handle various read requests and other operations to maintain or update persistent cache 120, in some embodiments.

Please note that previous descriptions of a client, filesystem, remote data store, and data set are not intended to be limiting, but are merely provided as logical examples.

This specification begins with a general description of a provider network that may implement a database service that may implement a lightweight filesystem for remote storage caching. Then various examples of a database service are discussed, including different components/modules, or arrangements of components/module, that may be employed as part of implementing the database service, in some embodiments. A number of different methods and techniques to implement a lightweight filesystem for remote storage caching are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
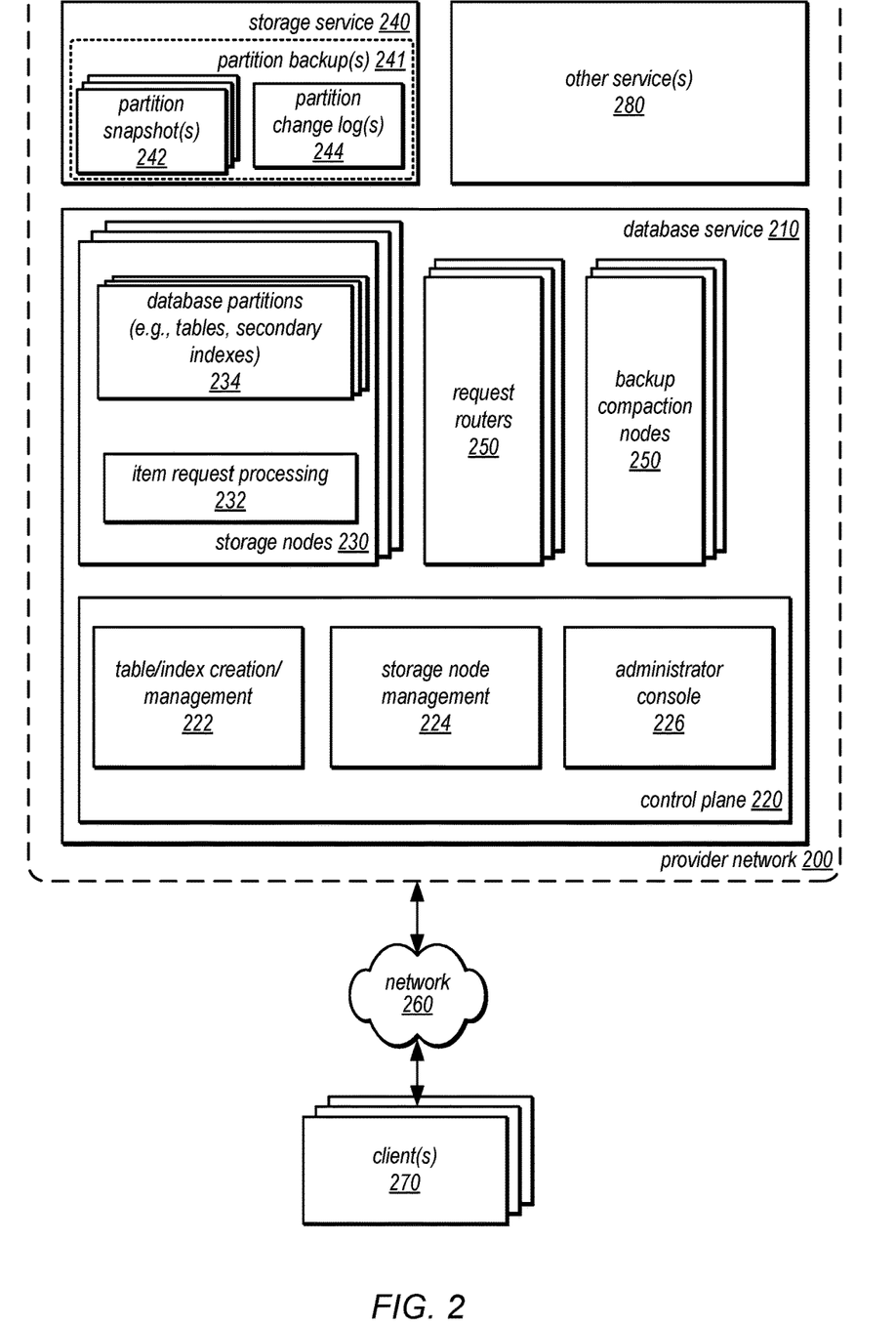
FIG. 2 is a logical block diagram illustrating a provider network offering a database service that may implement a lightweight filesystem for remote storage caching for a database, according to some embodiments.

FIG. 2 is a logical block diagram illustrating a provider network offering a database service that may implement a lightweight filesystem for remote storage caching for a database, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 8 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Database service 210 may implement various types of distributed database services, in some embodiments, for storing, accessing, and updating data in tables hosted in a database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL)) may be used to specify access requests.

In some embodiments, clients 270 may encompass any type of client configurable to submit network-based requests to provider network 200 via network 260, including requests for database service 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routers 250, in some embodiments. Request routers 250 may receive and parse client access requests, in various embodiments in order to determine various features of the request, to parse, authenticate, throttle and/or dispatch access requests, among other things, in some embodiments. Database service 210 may implement backup compaction nodes 250, which may perform compaction techniques including the generation of new data objects and merged data objects, as discussed in detail below with regard to FIGS. 3 and 4.

In some embodiments, database service 210 may implement control plane 220 to implement one or more administrative components, such as automated admin instances or nodes (which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiments. Administrator console 226 may allow system administrators to interact directly with database service 210 (and/or the underlying system). In some embodiments, the administrator console 226 may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with storage nodes 230 to initiate the performance of various control plane operations, such as moves of table partitions, merges of table partitions, splits of table partitions, update tables, delete tables, create secondary indexes, etc . . . . In some embodiments, control plane 220 may include a node recovery feature or component that handles failure events for storage nodes 230, propagation architectures 290 and request routers 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect merge, split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical filesystem mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table/index creation and management 222 to manage the creation (or deletion) of database tables and/or secondary indexes hosed in database service 210, in some embodiments. For example, a request to create a secondary index may be submitted via administrator console 226 (or other database service 210 interface) which may initiate performance of a workflow to generate appropriate system metadata (e.g., a table identifier that is unique with respect to all other tables in database service 210, secondary index performance or configuration parameters, and/or various other operations for creating a secondary index as discussed below). Backup management (not illustrated) may handle or manage backup requests to make copies as of a version or point-in-time of a database, as partition snapshots 242 and partition change log(s) 244 that together makeup partition backup(s) 241 in storage service 240 which may be used to perform an offline build of a replicated data set like a secondary index.

In some embodiments, database service 210 may also implement a plurality of storage nodes 230, each of which may manage one or more partitions of a database table or secondary index on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model).

In some embodiments, database service 210 may provide functionality for creating, accessing, and/or managing tables or secondary indexes at nodes within a multi-tenant environment. For example, database partitions 234 may store table item(s) from multiple tables, indexes, or other data stored on behalf of different clients, applications, users, accounts or non-related entities, in some embodiments.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210. In some embodiments, a replica group may include a primary storage node which may act as, for instance, a read-write node, for the partition. As discussed in detail below with regard to FIG. 3, a primary storage node of a replica group may also be involved in the management of Moreover, different replica groups may utilize overlapping nodes, where a storage node 230 may be a member of multiple replica groups, maintaining replicas for each of those groups whose other storage node 230 members differ from the other replica groups.

Different models or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key-value pairs, in any order, in some embodiments. In some embodiments, each attribute in an item may have a key, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s) and version attributes, in some embodiments. In some embodiments, the tables maintained by the database service 210 (and the underlying storage system) may have no pre-defined format other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition snapshots 242 as backups 241. Storage service 240 may implement striping, sharding, or other data distribution techniques so that different portions of a partition backup 241 are stored across multiple locations (e.g., at separate nodes). In at least some embodiments, update logs 244 (e.g., created by updates for database partitions 234 by item request processing 232) may be stored as objects in storage service 240.

Figure 3:
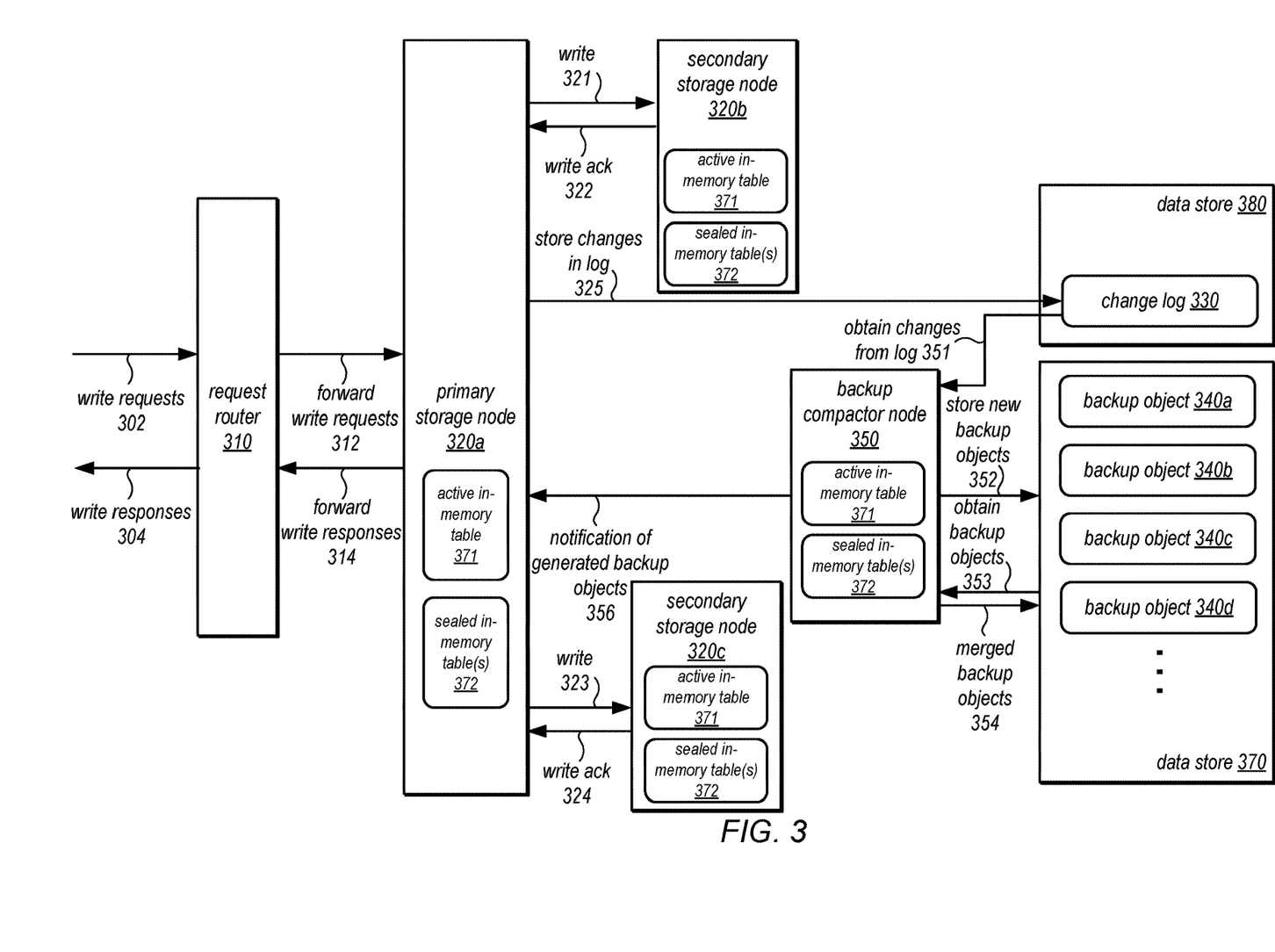
FIG. 3 is a logical block diagram illustrating interactions between storage nodes and backup compactor nodes, according to some embodiments.

FIG. 3 is a logical block diagram illustrating interactions between storage nodes and backup compactor nodes, according to some embodiments. Write requests 302 may be received at request router 310 and forwarded 312 to the appropriate primary storage node for the partition to which the write is directed. Primary storage nodes 320*a* may utilize a replication protocol to perform the write (e.g., by sending the write to secondary storage nodes 320*b* and 320*c* respectively, as indicated at 321 and 323). Acknowledgments, such as acks 322 and 324 may be returned to indicate to primary storage node 320*a* that the write completed successfully (e.g., to satisfy a quorum or other durability requirement). Primary storage node 320*a* may then forward a write response (or failure) as indicated at 314 to request router 310, which may return the write responses 304.

Primary storage node 320*a* may store changes in a change log 330 data store 380, as indicated at 325. For example, data store 380 may be an append only data store (e.g., a streaming data store). Primary storage node 320*a* may maintain an active in-memory table 371 and (if not determined to be flushed to data store 370) sealed in-memory table(s) 372. These active in-memory tables 371 and sealed in-memory table(s) 372 may be similar to those discussed above with regard to FIG. 1. Each secondary storage node 320*b* and 320*c* and backup compactor node 350 may maintain respective copies.

Backup node compactor 350 may generate new data objects which may, in some embodiments, be the immutable data objects storing database data or other data set data as discussed above with regard to FIG. 1, sometimes referred to as backup objects, by obtaining 351 the changes from the change log 330. In some embodiments, the changes 351 may indicate a sealed in-memory table (as determined by primary storage node 320*a* according to a detected triggering event as discussed below), such as one of sealed in-memory tables 372. Backup compactor node 350 may then generate a new backup object corresponding to the sealed in-memory table 372 (as described in the change log), and store 352 the backup object as part of backup objects 340*a*, 340*b*, 340*c*, 340*d*, and so on, in storage service 240.

A notification of the backup object being stored may be returned, as indicated at 356 which may allow primary storage node 320*a* (and secondary storage nodes 320*b* and 320*c*) to discard the sealed in-memory table 372, freeing up memory. Moreover, notification 356 may indicate to primary storage node 320*a* (and secondary storage nodes 320*b* and 320*c*) that the backup object can be obtained from storage service 370 (if desirable). Backup compactor node 350 may also compact backup objects by obtaining backup objects 353 and storing merged backup objects 354.

Figure 4:
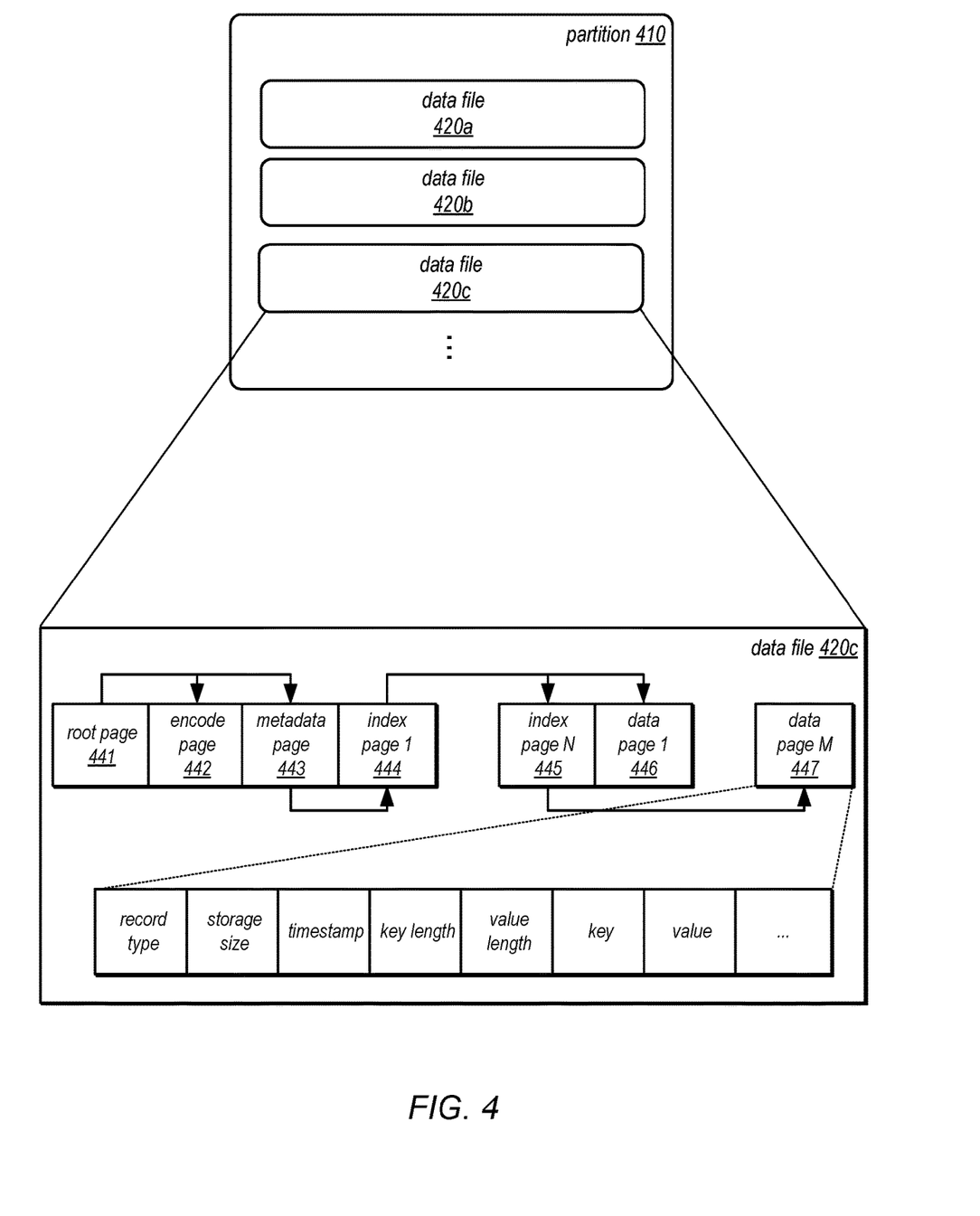
FIG. 4 is a logical block diagram illustrating partitions, data files and data object formats, according to some embodiments.

FIG. 4 is a logical block diagram illustrating partitions, data files and data object formats, according to some embodiments. A partition may be stored in a backup partition that is the authoritative source for the partition assigned or accessed via a storage node, as discussed above with regard to FIGS. 2 and 3. As illustrated in FIG. 4, a partition 410 may be described using a list, manifest, or other set of metadata that describes a corresponding set of data files, such as data files 420*a*, 420*b*, 420*c*, and so on. As discussed above, when writes a performed, the changes are incorporated into new data objects which store the data files 420.

An example of a data object illustrated with regard to data file 420*c* (e.g., which may be stored in storage service 240

(e.g., a cloud-based object storage service) or other remote data store as a data storage unit, collection, or object of that remote data store). Data file 420c may store the items of a database table in key value and time ordering (e.g., a1, then a2, then a3, and so on) in some embodiments. Data object 420c may implement root page 441 which identifies locations of encode page 442 (e.g., indicating the presence and type of encryption and/or compression of data object 140 for one or more index and/or data pages and, which may also allow for different encryption and/or compression techniques to be applied to the pages), metadata page 443 containing metadata about the data file 420c, index pages 444 through 445 (e.g., b-tree or other index structure pages) which organize the items to be sorted in key value and time order, and data pages 446 through 447, which may include the items (e.g., record type, storage size, timestamp, key length, key value pair and among other possible information). An example layout of a data page is illustrated, including fields of record type, storage size, timestamp, key length, key, value, cyclic redundancy check (CRC) value(s) and so on). In some embodiments, a key and values may be stored as an array of byte arrays. In some embodiments, multiple data objects, including new data file may be stored together to make up a backup of the data set (e.g., of a partition of a database). For example, each of the multiple data files may together implement a log-structured merge tree (sometimes referred to as an LSM tree).

Figure 5:
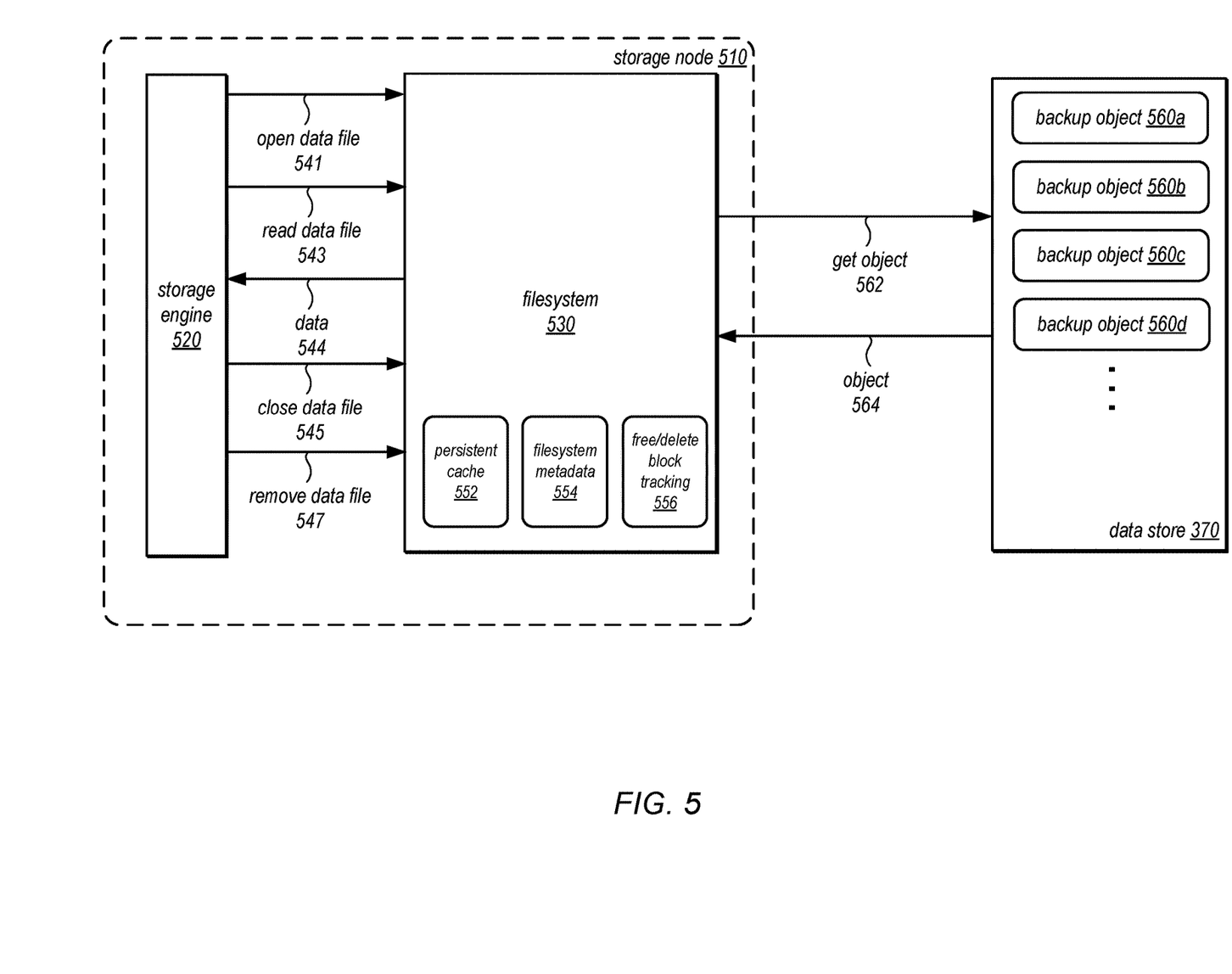
FIG. 5 is a logical block diagram illustrating interactions between a storage engine of a database system and a lightweight filesystem for remote storage caching, according to some embodiments.

FIG. 5 is a logical block diagram illustrating interactions between a storage engine of a database system and a lightweight filesystem for remote storage caching, according to some embodiments. Storage node 510 may implement storage engine 520, which may handle data access requests from a database management system, both of which may be implemented as part of item request processing 232, along with filesystem 530.

Filesystem 530 may implement an interface that supports requests, such as request to open a data file 541. Request to open a data file 541 may specify the identifier (e.g., object ID, name, file path, pointer, or other lookup information) for the immutable data object, one of backup objects 560a, 560b, 560c, or 560d, in data store 370. Once opened, filesystem 530 may asynchronously get object 562 from data store 370 and update persistent cache 552, filesystem metadata 554, and free/delete block tracking 556 accordingly.

Figure 6:
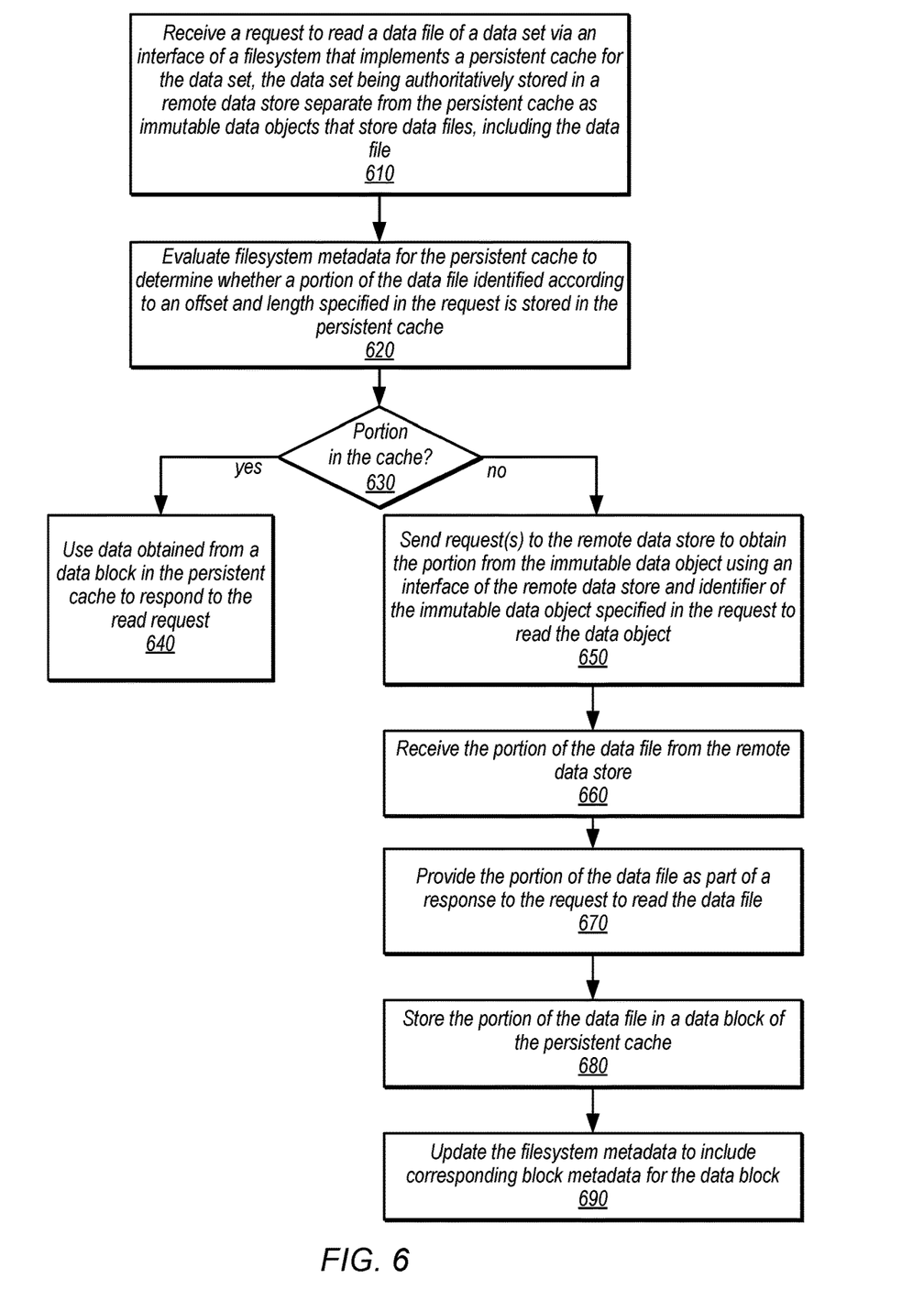
FIG. 6 is a high-level flowchart illustrating various methods and techniques to implement a lightweight filesystem for remote storage caching, according to some embodiments.

Request to read a data file 543 may implement techniques similar to those discussed below with regard to FIG. 6. Filesystem 530 may check for data in persistent cache 552 and if needed get 562 a corresponding backup object from data store 370, and use the returned object 564 to provide data 544 in response to the read request, as well as update the persistent cache 552, and free/delete block tracking 556.

Request to close data file 545 may be received at filesystem 530 and close the file for access. This may, for example, decrement a reference count to the data file which if goes to zero may allow for the data file to be removed from persistent cache 552. Request to remove data file 547 may cause the data blocks in persistent cache 552 for the data file to be marked for deletion in free/delete block tracking 556, which may then be asynchronously performed.

The examples of a database that implements lightweight filesystem for remote storage caching as discussed in FIGS. 2-5 above have been given in regard to a database service (e.g., a relational database, a document database, a non-relational database, etc.). However, various other types of database systems or storage systems can advantageously implement a lightweight filesystem for remote storage caching when authoritative data is remotely stored, in other embodiments. FIG. 6 is a high-level flowchart illustrating various methods and techniques to implement a lightweight filesystem for remote storage caching, according to some embodiments. These techniques, as well as the techniques discussed with regard to FIG. 7, may be implemented using components or systems as described above with regard to FIGS. 2-4, as well as other types of databases or storage systems, and thus the following discussion is not intended to be limiting as to the other types of systems that may implement the described techniques.

As indicated at 610, a request to read a data file of a data set via an interface of a filesystem that implements a persistent cache for the data set may be received, in various embodiments. In some embodiments, the data set may be authoritatively stored in a remote data store that is separate from the persistent cache. The data set may be stored, in some embodiments, as a set of immutable data objects that store data files, including the data file. In some embodiments, to write to the data set, new data objects are created instead of altering existing data objects and thus individual data objects are immutable until deleted or otherwise made unavailable as a whole.

As indicated at 620, filesystem metadata for the persistent cache may be evaluated to determine whether a portion of the data file identified according to an offset (e.g., number of bytes or other storage units from a starting point of the file or a file cursor) and length (e.g., number of bytes or other storage units to read from the offset) specified in the request is stored in the persistent cache, in some embodiments. The filesystem metadata may maintain respective copies of block metadata stored as part of data blocks in the persistent cache in a memory, providing fast access to block metadata without the use of a hierarchal structure such as a directory.

As indicated by the positive exit from 630, if the portion of data is in the cache, then data obtained from a data block in the persistent cache may be used to respond to the read request, in some embodiments.

As indicated by the negative exit from 630, if the portion of data is not in the cache, then request(s) may be sent to the remote data store to obtain the portion from the immutable data object using an interface of the remote data store and identifier of the immutable data object specified in the request to read the data object, in some embodiments.

As indicated at 660, the portion of the data file may be received from the remote data store, in some embodiments. As indicated at 670, the portion of the data file may be provided as part of a response to the request to read the data file, in some embodiments. The portion of the data file may be stored in a data block of the persistent cache, as indicated at 680, and the filesystem metadata may be updated to include corresponding metadata for the data block, in some embodiments.

Figure 7:
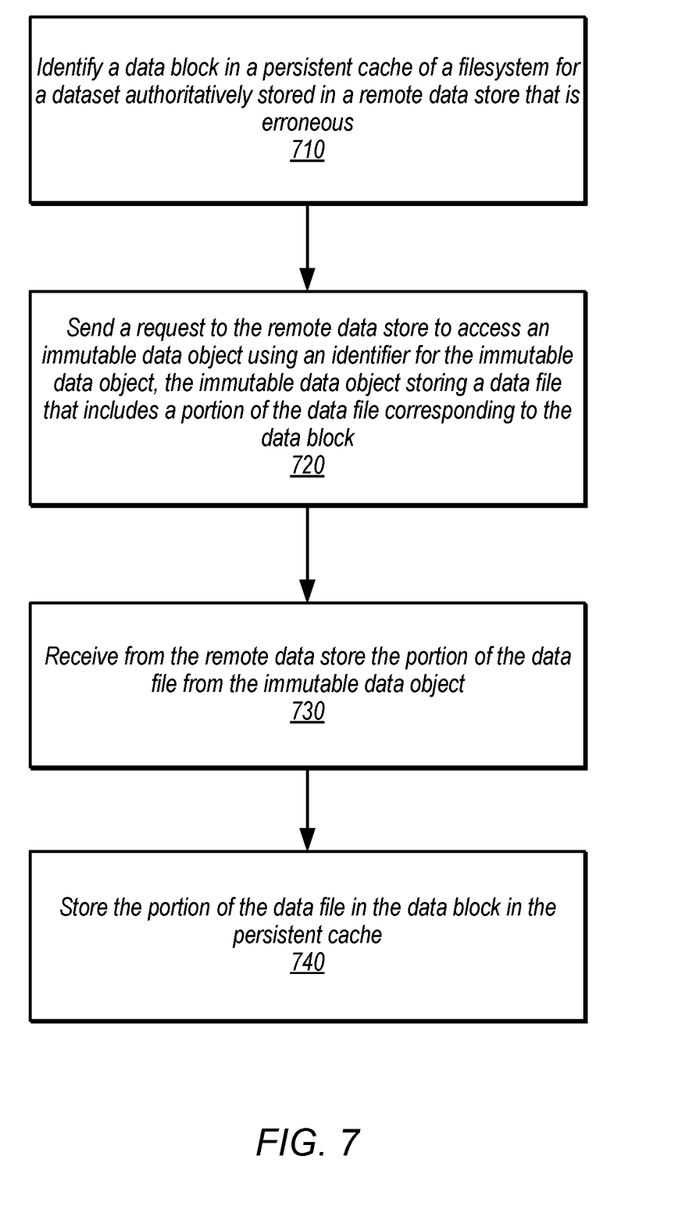
FIG. 7 is a high-level flowchart illustrating various methods and techniques to implement reloading erroneous data blocks in a persistent storage cache for a remote data store, according to some embodiments.

Because the remote data store is the authoritative source of the data set, filesystem features such as metadata maintained to ensure correctness and handle failures need not be maintained as part of the lightweight filesystem. Instead, low memory and other resource saving techniques can be implemented, which can improve the performance of an application utilizing the lightweight filesystem (e.g., by conserving resources for other operations). FIG. 7 is a high-level flowchart illustrating various methods and techniques to implement reloading erroneous data blocks in a persistent storage cache for a remote data store, according to some embodiments.

As indicated at 710, a data block in a persistent cache of a filesystem for a data set authoritatively stored in a remote data store may be identified that is erroneous, in some embodiments. For example, the data block may store incomplete or corrupted data values (e.g., as evidenced by a check sum or other data integrity feature) or missing/incorrect block metadata. The identification may occur as part of performing a read request, in some embodiments. In some embodiments, a background process or other cache management process may check the persistent cache for erroneous blocks and proactively reload erroneous blocks.

As indicated at 720, a request may be sent to the remote data store to access an immutable data object using an identifier for the immutable data object, in some embodiments. The identifier for the immutable data object may be maintained in the filesystem metadata, in some embodiments. The immutable data object may store a data file that includes a portion of the data file corresponding to the data block, in some embodiments.

As indicated at 730, the portion of the data file from the immutable data object may be received from the remote data store, in some embodiments. As indicated at 740, the portion of the data file may be stored in the data block in the persistent cache, in some embodiments.

The methods described herein may in various embodiments be implemented by any combination of hardware and software. For example, in some embodiments, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
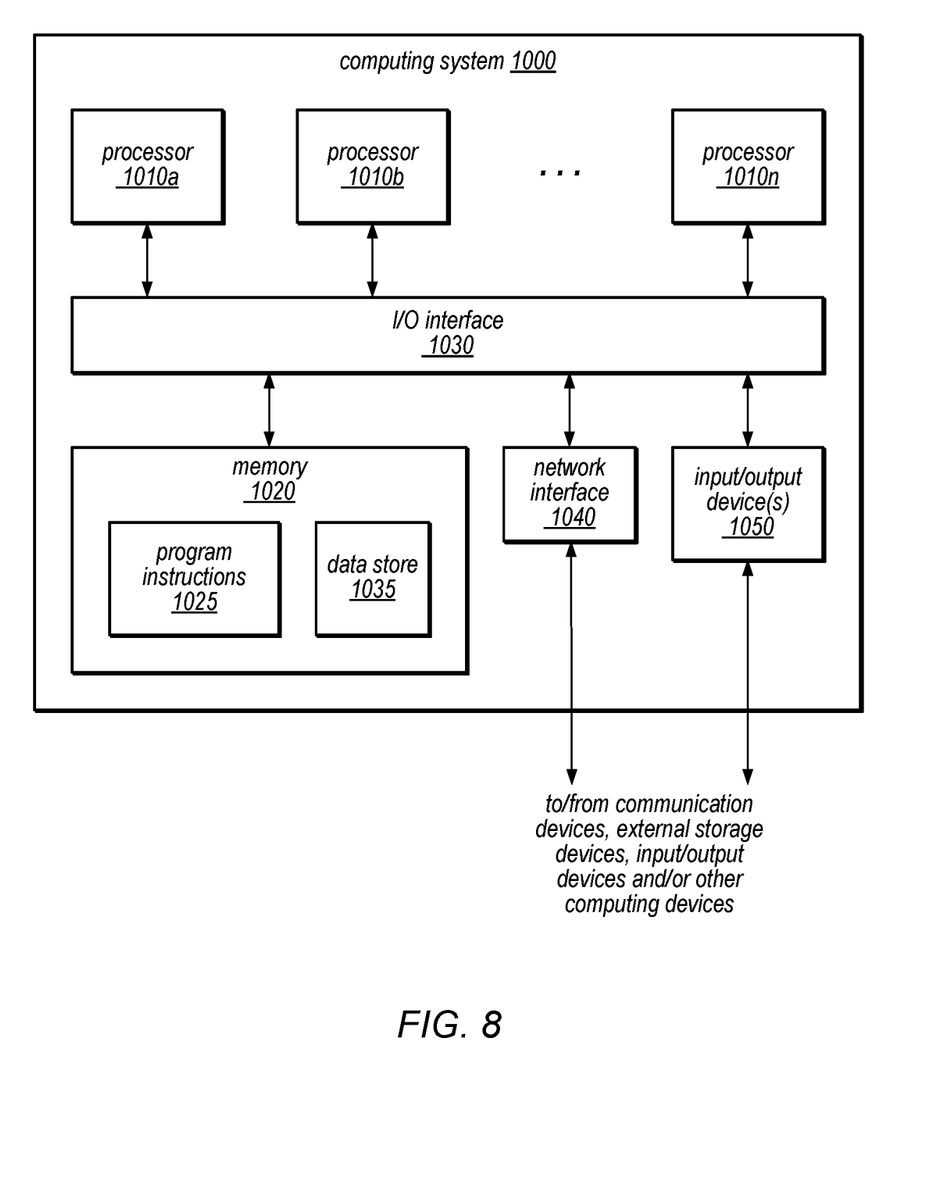
FIG. 8 is a block diagram illustrating an example computing system, according to some embodiments.

Embodiments to implement a lightweight filesystem for remote storage caching as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device. In various embodiments, computing systems may be implemented as virtual machines or other compute capacity (that still execute on hardware computing systems that implement virtualization), which may include, but are not limited to an instance, a container, a microVM, a node, or any other forms of compute capacity that may execute components or workflows described above.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement a lightweight filesystem for remote storage caching, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor;
   at least one block-based, persistent storage device, implementing a persistent cache for a database, wherein the persistent cache comprises a plurality of data blocks that store respective portions of a plurality of data files in the database authoritatively stored in a plurality of immutable data objects in a cloud-based object storage service and respective block metadata that indicates respective lengths and offsets of the respective portions of the plurality of data files, wherein the plurality of data blocks are stored in the persistent cache without directory hierarchy; and at least one memory, storing:

a filesystem metadata that comprises copies of the respective block metadata for the plurality of data blocks of the persistent cache; and program instructions that when executed by the at least one processor, cause the at least one processor to implement a filesystem for the database, wherein the filesystem is configured to:

receive, from a storage engine of a database management system, a request to read a data file of the database via an interface of a filesystem, wherein the read request specifies an identifier for an immutable data object that stores the data file, an offset to read from within the immutable data object, and length of the data file;

evaluate the filesystem metadata to determine that at least one portion of the data file identified according to the offset and the length is not stored in the persistent cache;

send one or more requests to the cloud-based object storage service to obtain the at least one portion of the data file from the immutable data object using an interface of the cloud-based object storage service that provides access to the immutable data object;

receive the at least one portion of the data file from the cloud-based object storage service;

provide the at least one portion of the data file as part of a response to the request;

store the at least one portion of the data file in one of the plurality of data blocks along with corresponding block metadata; and update the filesystem metadata to include the corresponding block metadata for the one data block.

2. The system of claim 1, wherein the filesystem is further configured to:

receive a different request to read the data file of a data set via the interface of the filesystem;

evaluate the filesystem metadata for the persistent cache to determine that the at least one portion of the data file identified according to the offset and the length is stored in the persistent cache; and provide the at least one portion of the data file read from the one data block in the persistent cache as part of a response to the request.

3. The system of claim 1, wherein the filesystem is further configured to:

identify one of the data blocks in the persistent cache as erroneous;

send a request to the cloud-based object storage service to obtain data from one of the immutable data objects storing one of the data files that corresponds to the identified one data block;

receive from the cloud-based object storage service the data from the one immutable data object; and store the data in the identified one data block in the persistent cache.

4. The system of claim 1, wherein the storage engine and the filesystem are implemented on a storage node assigned a partition of the database as part of a non-relational database service.

5. A method, comprising:

receiving a request to read a data file of a data set via an interface of a filesystem that implements a persistent cache for the data set, wherein the read request specifies an identifier for an immutable data object that stores the data file, an offset to read from within the immutable data object, and length of the data file, wherein the data set is authoritatively stored in a remote data store separate from the persistent cache, and wherein the data set comprises a plurality of immutable data objects, including the immutable data object, that store a plurality of data files, including the data file;

evaluating, by the filesystem, filesystem metadata for the persistent cache to determine that at least one portion of the data file identified according to the offset and the length is not stored in the persistent cache, wherein the persistent cache comprises a plurality of data blocks that store respective portions of the plurality of data files in the data set stored in the remote data store and respective block metadata that indicates respective lengths and offsets of the respective portions of the plurality of data files, wherein the plurality of data blocks stored in the persistent cache without directory hierarchy;

sending, by the filesystem, one or more requests to the remote data store to obtain the at least one portion of the data file from the immutable data object using an interface of the remote data store that provides access to the immutable data object;

receiving, at the filesystem, the at least one portion of the data file from the remote data store;

providing, by the filesystem, the at least one portion of the data file as part of a response to the request;

storing, by the filesystem, the at least one portion of the data file in one of the plurality of data blocks along with corresponding block metadata; and updating, by the filesystem, the filesystem metadata to include the corresponding block metadata for the one data block.

6. The method of claim 5, wherein a write to the data set is performed by adding a new immutable data object to the plurality of immutable data objects that includes the write.

7. The method of claim 5, wherein the interface of the remote data store supports parallel access to the remote data object.

8. The method of claim 5, further comprising:

receiving, at the filesystem, a different request to read the data file of a data set via the interface of the filesystem;

evaluating, by the filesystem, the filesystem metadata for the persistent cache to determine that the at least one portion of the data file identified according to the offset and the length is stored in the persistent cache; and providing, by the filesystem, the at least one portion of the data file read from the one data block in the persistent cache as part of a response to the request.

9. The method of claim 5, further comprising:

receiving, at the filesystem, a request to open one of the plurality of data files;

sending, by the filesystem, one or more requests to the remote data store to obtain data from one of the immutable data objects storing the one data file;

receiving, by the filesystem, from the remote data store the data from the one immutable data object; and storing, by the filesystem, the data in one or more of the plurality of data blocks in the persistent cache; and updating, by the filesystem, the filesystem metadata to include respective metadata for the one or more data blocks.

10. The method of claim 5, further comprising:
receiving, at the filesystem, a request that causes removal of one of the plurality of data files; and
updating, by the filesystem, delete tracking information to asynchronously remove one or more of the plurality of data blocks corresponding to the one data file.

11. The method of claim 5, further comprising:
identifying, by the filesystem, one of the data blocks in the persistent cache as erroneous;
sending, by the filesystem, a request to the remote data store to obtain data from one of the immutable data objects storing one of the data files that corresponds to the identified one data block;
receiving, by the filesystem, from the remote data store the data from the one immutable data object; and
storing, by the filesystem, the data in the identified one data block in the persistent cache.

12. The method of claim 11, wherein the identifying is performed as part of a background process that evaluates the persistent cache.

13. The method of claim 5, wherein the data set is a database and wherein the request to read the data file is received from a storage engine of a database system that provides access to the database.

14. One or more non-transitory, computer-readable storage media, storing program instructions that when executed on or across one or more computing devices cause the one or more computing devices to implement:
receiving a request to read a data file of a data set via an interface of a filesystem that implements a persistent cache for the data set, wherein the read request specifies an identifier for an immutable data object that stores the data file, an offset to read from within the immutable data object, and length of the data file, wherein the data set is authoritatively stored in a cloud-based object storage service, and wherein the data set comprises a plurality of immutable data objects, including the immutable data object, that store a plurality of data files, including the data file;
evaluating, by the filesystem, filesystem metadata for the persistent cache to determine that at least one portion of the data file identified according to the offset and the length is not stored in the persistent cache, wherein the persistent cache comprises a plurality of data blocks that store respective portions of the plurality of data files in the data set stored in the cloud-based object storage service and respective block metadata that indicates respective lengths and offsets of the respective portions of the plurality of data files, wherein the plurality of data blocks stored in the persistent cache without directory hierarchy;
sending, by the filesystem, one or more requests to the cloud-based object storage service to obtain the at least one portion of the data file from the immutable data object using an interface of the cloud-based object storage service that provides access to the immutable data object;
receiving, at the filesystem, the at least one portion of the data file from the cloud-based object storage service;
providing, by the filesystem, the at least one portion of the data file as part of a response to the request;
storing, by the filesystem, the at least one portion of the data file in one of the plurality of data blocks along with corresponding block metadata; and updating, by the filesystem, the filesystem metadata to include the corresponding block metadata for the one data block.

15. The one or more non-transitory, computer-readable storage media of claim 14, wherein a write to the data set is performed by adding a new immutable data object to the plurality of immutable data objects that includes the write.

16. The one or more non-transitory, computer-readable storage media of claim 14, storing further program instructions that when executed by the one or more computing devices, cause the one or more computing devices to further implement:
receiving, at the filesystem, a different request to read the data file of a data set via the interface of the filesystem;
evaluating, by the filesystem, the filesystem metadata for the persistent cache to determine that the at least one portion of the data file identified according to the offset and the length is stored in the persistent cache; and
providing, by the filesystem, the at least one portion of the data file read from the one data block in the persistent cache as part of a response to the request.

17. The one or more non-transitory, computer-readable storage media of claim 14, storing further program instructions that when executed by the one or more computing devices, cause the one or more computing devices to further implement:
receiving, at the filesystem, a request to open one of the plurality of data files;
sending, by the filesystem, one or more requests to the cloud-based object storage service to obtain data from one of the immutable data objects storing the one data file;
receiving, by the filesystem, from the cloud-based object storage service the data from the one immutable data object; and
storing, by the filesystem, the data in one or more of the plurality of data blocks in the persistent cache; and
updating, by the filesystem, the filesystem metadata to include respective metadata for the one or more data blocks.

18. The one or more non-transitory, computer-readable storage media of claim 14, further storing further program instructions that when executed by the one or more computing devices, cause the one or more computing devices to further implement:
receiving, at the filesystem, a request that causes removal of one of the plurality of data files; and
updating, by the filesystem, delete tracking information to asynchronously remove one or more of the plurality of data blocks corresponding to the one data file.

19. The one or more non-transitory, computer-readable storage media of claim 14, storing further program instructions that when executed by the one or more computing devices, cause the one or more computing devices to further implement:
identifying, by the filesystem, one of the data blocks in the persistent cache as erroneous;
sending, by the filesystem, a request to the cloud-based object storage service to obtain data from one of the immutable data objects storing one of the data files that corresponds to the identified one data block;
receiving, by the filesystem, from the cloud-based object storage service the data from the one immutable data object; and
storing, by the filesystem, the data in the identified one data block in the persistent cache.

20. The one or more non-transitory, computer-readable storage media of claim 14, wherein the data set is a database stored as part of a database service offered by a provider network, wherein the request to read the data file is received from a storage engine of a database system implemented as part of the database service for the database.

\* \* \* \* \*